July 2, 1968     GEORGE S. WING     3,390,906
JOINT WITH INHERENTLY LIMITED TORQUE LEVEL
Original Filed June 24, 1964
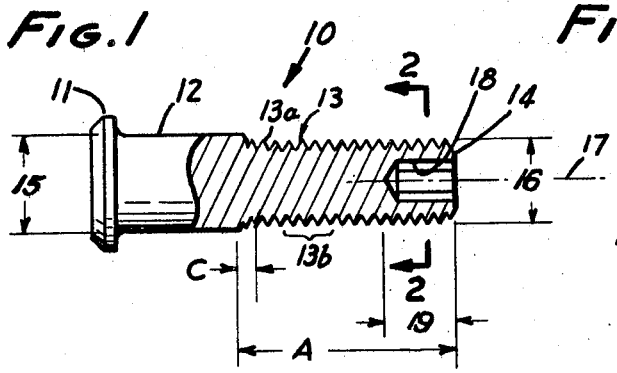
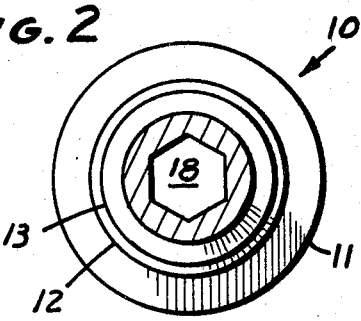
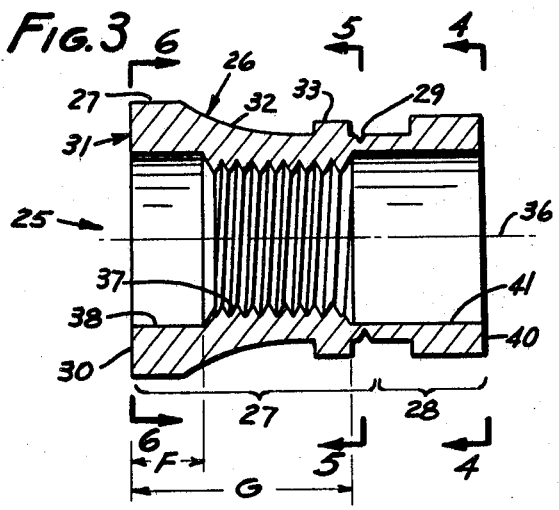
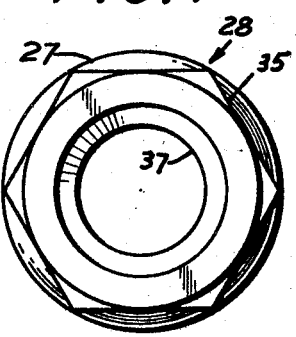
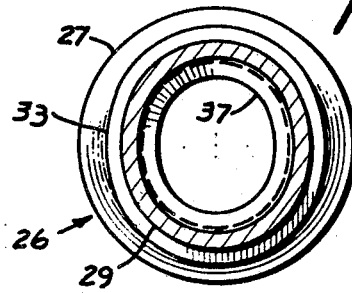
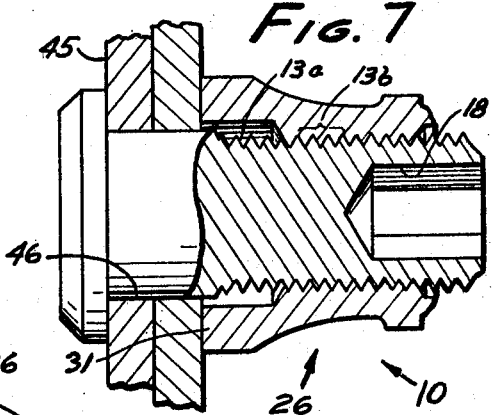
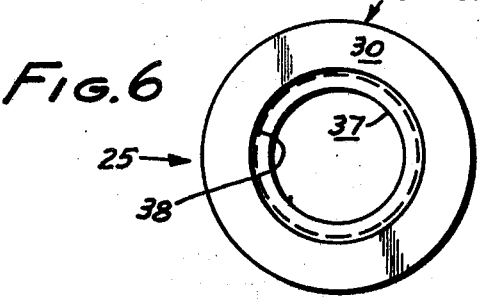
INVENTOR.
GEORGE S. WING
BY
ATTORNEYS.

United States Patent Office 3,390,906
Patented July 2, 1968

3,390,906
JOINT WITH INHERENTLY LIMITED
TORQUE LEVEL
George S. Wing, Torrance, Calif., assignor to Hi-Shear Corporation, Torrance, Calif., a corporation of California
Continuation of application Ser. No. 377,761, June 24, 1964. This application July 31, 1967, Ser. No. 660,161
6 Claims. (Cl. 287—189.36)

ABSTRACT OF THE DISCLOSURE

A joint with an inherently limited torque level which comprises a workpiece having a hole therethrough, together with a fastener system which includes a headed threaded pin and an inherently torque-limited nut. The pin fits in the hole with the head bearing at one end, and with the nut bearing at the other.

The joint possesses inherent reliability and integrity because a counterbore in the nut clears all incomplete threads on the pin adjacent to the workpiece, and makes a threaded engagement with three fully-formed threads on the pin.

Optional features include the provision of a wrench-engaging recess in the threaded end of the pin which does not weaken the axial region where the three fully-formed threads are engaged, and a fluid-sealing joint wherein the pin makes an interference fit in the hole.

---

This invention relates to a joint with an inherently limited torque level which includes an inherently torque-limited fastener.

This application is a continuation of applicant's co-pending application Ser. No. 377,761, filed June 24, 1964, entitled "Fastener Systems," now abandoned, which in turn was a continuation-in-part of applicant's then co-pending application Ser. No. 129,699, filed Aug. 7, 1961, entitled, "Fasteners," now U.S. Patent No. 3,138,987, issued June 30, 1964, which in turn was a continuation-in-part of applicant's application Ser. No. 661,874, filed May 27, 1957, entitled, "Fastener and Tool for Setting the Same," now abandoned, said Ser. No. 129,699 also being a continuation-in-part of applicant's application Ser. No. 793,861, filed Feb. 17, 1959, entitled, "Fastener," now abandoned, which is a division of applicant's application Ser. No. 643,183, filed Feb. 28, 1957, now U.S. Patent No. 2,940,495, issued June 14, 1960, entitled, "Lock Nut With Frangible Driving Portion."

Fastener systems wherein a portion of a pin or of a collar shears off at a predetermined torque are known from the aforesaid patents, and from George S. Wing Patent No. 3,041,902, issued July 3, 1962. They have in common the features of a threaded pin and a threaded collar, one of which has a portion of reduced cross-sectional area which shears off upon the application of a torque of given value. This shearing provides a visible indication that the fastener has been set to the given torque, and it also prevents additional torque from being applied to the system, because the portion which shears off includes a set of wrench-engaging surfaces. The torque level which can be reached in the joint is inherently limited, because once the said portion is separated from the nut, there can be no further application of torque, and this limitation is inherent in the fastener system itself.

The fasteners which are the subject of the aforementioned patents have become increasingly popular and with their increase in popularity have come new applications and requirements. One requirement for joints utilizing this class of fastener is that, when the collar shears off at the inherently-limited torque value, the design levels of tightness such as axial pre-load must have been achieved, and that this be predictable from joint to joint. It is a fact that a given torque level can be reached without simultaneously attaining these other design levels. For example, engagement by the nut with incomplete threads on the pin can adversely affect the axial pre-load, making its level unpredictable. As another example, penetration of wrench-engaging means into the pin to a region wherein a significant portion of the tension load is taken up by the nut may seriously reduce the strength of the joint. As another example, failure to provide three convolutions of engaged fully-formed threads may seriously reduce the strength of the joint. Thus even with a given torque level attained, other design levels which are just as necessary may be missed. However, the sole controllable parameter is torque, so it is important to make the other design levels predictable and attainable when the torque level is reached. It should be borne in mind that these joints are formed in production operations, and that there will therefore be a requirement for a substantial grip range, while still achieving these requirements. It is an object of this invention to meet these requirements.

The joint produced is also adaptable to meet another product requirement, namely for an inherently torque-limited joint which is fluid-tight.

It is an optional object of this invention to provide an inherently torque-limiting fastener system with inherent means for protection against corrosion due to water, splash or submersion, thereby rendering the system suitable for shipboard use even in submerged applications, and this without requiring any coatings or sealants. This also results in a joint with significantly higher allowable shear strength.

A joint according to this invention includes in combination a workpiece with a hole therethrough in which there fits a pin which has a longitudinal axis and a circularly cylindrical shank having a first diameter. The pin also bears an exterior circumferential thread which is disposed adjacent the first end of the pin and which has a second diameter, which is the largest diameter of the thread, this second diameter being no greater than the diameter of the hole. The pin thread includes at least one incomplete convolution and at least three fully-formed convolutions. In the assembled joint, all of the incomplete convolutions stand outside the hole. Also, there is a wrench-engaging means which is formed at the first end of the pin.

The joint further includes an inherently torque-limited collar which is adapted to be threaded onto the pin, this collar comprising a body which has a longitudinal axis and which has an axially-extending pin-receiving hole therethrough. The collar includes a bearing section and a wrench-engaging section, there being a bearing surface on a first end of the bearing section at a first end of the body, which bearing surface lies substantially normal to the longitudinal axis. Wrench-engaging surfaces are provided on the wrench-engaging section adjacent to the second end of the collar. An internal thread is medially disposed in the wall of the pin-receiving hole and adapted to engage the thread on the pin. A counterbore bounds the hole contiguous to the first end of the nut, this counterbore having a minimum aperture which is greater than the second diameter. The axial extent of the internal thread is such as to provide at least three complete convolutions engageable by and engaged to three fully-formed threads of the pin over the full grip range of the pin. The axial extent of the counterbore is such that all of said incomplete threads are contained therein. A thread-clearance bore bounds the hole contiguous to the second end of the collar and extends axially to the thread. It has a minimum aperture greater than the said second diameter. A circumferential groove is formed in the body, the groove being disposed between the bearing and wrench-engaging sections. It provides a reduced cross-section that has the minimum torsional shear strength of the collar, whereby the maximum torque which can be exerted between the sections is determined by this groove, the wrench-engaging section shearing off when torque of a predetermined value is exerted between the sections whereby the collar is shortened to the length of the bearing section in the assembled joint.

According to a preferred but optional feature of the invention, this combination includes a workpiece having a hole therethrough with a diameter substantially such as to make an interference fit with the first diameter on the cylindrical shank of the pin. This interference fit results in a fluid seal at the shank.

According to still another preferred but optional feature, the wrench-engaging means on the pin comprises a non-circular recess extending axially into the pin from the first end thereof, which recess penetrates to a depth insufficient to reduce the cross-section of the pin within the three of said engaged fully-formed threads which are closest to the incomplete threads.

The above and other features of this invention will be fully understood from the following detailed description and the accompanying drawings, in which:

FIG. 1 is a side view partly in axial cutaway cross-section showing a pin according to the present invention;

FIG. 2 is a cross-section taken at line 2—2 of FIG. 1;

FIG. 3 is an axial cross-section of a collar according to the invention;

FIG. 4 is a right-hand end view of FIG. 3;

FIG. 5 is a cross-section taken at line 5—5 of FIG. 3;

FIG. 6 is a left-hand end view of FIG. 3; and

FIG. 7 is an axial cross-section showing the fastener system according to the invention.

The drawings show the presently preferred embodiment of the invention. In FIG. 1, there is shown a pin 10 with a head 11, a shank 12 which is circularly cylindrical, an external thread 13 and a first end 14. The shank has a first diameter 15 and the thread has a second diameter 16, diameter 16 being the greatest diameter of any part of the thread, the second diameter being no greater and preferably somewhat less than the first diameter. The thread includes at least one imperfect convolution 13a, as is common with rolled and machined heads. It also has at least three fully-formed convolutions 13b, as will be more fully disclosed hereinafter.

The pin has a longitudinal axis 17. At the first end there is wrench-engaging means which could be such as a stub which bears external wrenching surfaces or the like, but which is preferably a wrench-engaging recess 18. This recess extends axially into the pin from that end. This recess is preferably of the Allen-wrench type, is centered on the axis and is symmetrical relative thereto. It extends into the pin to a depth to be discussed below. This recess is non-circular in order that it may be engaged by a torque-type tool such as an Allen head wrench (torque type tools hereinafter being generically referred to as wrenches), so as to hold the pin against rotation when the fastener system is being set. The depth of the recess in the pin is indicated by dimension 19.

A collar 25 is shown in FIG. 3. This collar includes a body 26 which has a bearing section 27 and a wrench-engaging section 28. These sections are spaced apart by a groove 29. The bearing section includes a bearing surface 30 lying normal to axis 36 of the collar which is preferably, but need not be, a flat annulus, and is adapted to bear against a workpiece 45 when the fastener is set. This bearing surface is disposed at the first end 31 of the collar. The external surface of the bearing section is reduced by a taper 32 which serves to lighten the weight of the body. The bearing section includes a stiffening shoulder 33 which is contiguous to groove 29, and terminates at the groove.

Wrench-engaging section 28 includes wrench-engaging means in the form of surfaces 35 which are preferably formed in a hexagonal array, although it will be understood that their basic characteristic is that of being non-circular so as to be engageable by a torque-applying wrench. Again the term "wrench" is used generically for torque-applying tools.

Body 26 has a longitudinal axis 36 and also an axially extending hole 37. This hole includes a counterbore 38 contiguous to the first end of the body. The depth of the counterbore will be discussed below. Contiguous to the counterbore there is an internal thread 39 adapted to make a threaded fit with threads 13 of the pin. On the opposite side of thread 39 from counterbore 38 and adjacent to second end 40 of the collar there is a thread-clearance hole 41.

Counterbore 38 and thread-clearance hole 41 are most conveniently made circular, although they could have other configurations if preferred. The minimum aperture of the counterbore is that of first diameter 15, and the minimum aperture of the thread-clearance hole is that of second diameter 16. The counterbore can thereby clear the projecting end of shank 12 while receiving and containing the incomplete threads (see FIG. 7). Thread-clearance hole 41 clears the pin threads so as not to become engaged to them at all, thereby permitting the wrench-engaging section to fall free when the collar parts at groove 29.

Internal thread 39 extends axially through the stiffening shoulder 33 and terminates short of the wrench-engaging section. Groove 29 serves as the division point of the two sections, and is a convenient way of forming a region of minimum cross-sectional area axially even with the said groove.

Preferably, although not necessarily, the stiffening shoulder is pressed out-of-round after the nut is formed, so as to assume the oval shape best shown in FIG. 5. When the collar is turned down onto the pin, the out-of-round structure is forced back into round by the pin, and the springback force of the collar serves as a lock to hold the collar in its finally torqued condition on the pin.

FIG. 7 shows the presently preferred embodiment of the system including a workpiece 45. As can be seen, the system has now been set and the wrench-engaging section has been torqued off by virtue of the application of sufficient torque to do the same. Suitable dimensions in inches for two fasteners of the type disclosed in the drawings are provided in the following table:

| Nominal Fastener Size | A | 19 | C | 15 | 16 | F | G | Diameter of Hole 46 |
|---|---|---|---|---|---|---|---|---|
| ¼" | .395 | .150 | .050 | .2495 | .241 | .145 | .375 | .2480 |
| ⅜" | .545 | .200 | .060 | .3745 | .364 | .150 | .500 | .3730 |

The relationships inherent in the above dimensions and which provide the advantages which are the objects of this invention are as follows. First, in a threaded engagement between a collar (nut) and a pin (bolt), 80% of the load is taken up by the first three complete threads closest to the workpiece. In this region, the pin should be solid across its cross-section. It therefore follows that where a wrench-engaging recess is used, it should not penetrate into the region of the three important threads for that specific installation. However, this is relatively difficult to do, for the reason that as a matter of good industrial practice, a pin should have a fairly broad grip range so that a minimum number of pin lengths need to be stocked.

In fields such as riveting, grip range is a relatively minor problem, because the plasticity of the fastener during setting accommodates to a certain degree. However, threaded fasteners are built to size and are not plastically deformed at any time.

Furthermore, in threads on any pin, there will always be a thread or two closest to the shank which is or are incomplete (not fully formed), because of the way threads are made. It does no real good for the nut to engage these threads, because the results are unpredictable. A threaded fastener, to have grip range and the necessary strength, must therefore provide means for engaging three perfect threads of the collar and pin over a range as wide as ±1/32″ from a nominally correct length. This is, in part, accomplished by counterbore 28, which is of such length as to clear and receive without engagement the incomplete threads 47 of the pin, also clearing whatever portion of shank 12 projects beyond the workpiece (as shown in FIG. 7) and by the threads in the collar being of such length as to receive the three fully formed threads which it will engage when the fastener is fully set. The fasteners detailed above accomplish this over a grip range of ±1/32″. The foregoing conditions exist with bearing surface 31 brought up against the workpiece, and with the joint tightly set to its predetermined torque level. All incomplete pin threads are disposed outside the workpiece; none is in the hole in the workpiece.

The cylindrical portion of the shank will preferably make an interference fit in the hole in the workpiece. An interference fit is properly represented by a hole diametrically undersized by between 0.0015″–0.0035″ relative to the shank that is to be fitted into it. The pin may be pressed or pulled into the hole in accordance with known techniques. Were the threads on the pin to be pulled through in interference, they would either be galled, or tend to ream out or scour the hole wall. For this reason, thread diameter 16 is made smaller than diameter 15 of shank 12 by an amount at least sufficient to permit the thread to pass freely through hole 46. If fluid-sealing is not desired, and scouring or reaming is tolerable, then diameter 16 need only be no greater than diameter 15. An interference fit is an example of a close tolerance fit which is customarily utilized in high-grade fasteners of the type illustrated.

The depth of groove 29 is determined as a function of the torque desired as a limiting value which in turn is a function of the strength of the materials utilized and the cross-sectional area, and its placement relative to the longitudinal axis.

This invention thereby contemplates a joint readily assembled with production techniques in which the imperfect threads common to threaded shanks have no effect on the reliability of the joint, in which three engaged fully-formed convolutions provide reliable strength levels, and in which, when a wrench-engaging recess is used, the strength of the joint is not adversely affected.

This invention is not to be limited by the embodiments shown in the drawings and described in the description which are given by way of illustration and not of limitation, but only in accordance with the scope of the appended claims.

What is claimed:

1. A joint assembled to a torque level that is inherently determined by one of its parts, comprising in combination: a workpiece having a circularly cylindrical hole therethrough with a diameter, a dimension of length, and a bearing region surrounding one end of the hole; a pin having a longitudinal axis, a circularly cylindrical shank having a first diameter disposed in the hole in the workpiece, and an exterior circumferential thread adjacent to a first end of the pin and having a second diameter which is the largest diameter of the thread, the second diameter being no greater than the diameter of the hole in the workpiece, the thread including at least one incomplete convolution adjacent to the shank and at least three fully-formed convolutions, all of the incomplete convolutions standing outside the hole, and wrench-engaging means formed adjacent to the first end of the pin; and an inherently torque-limited collar threaded onto said pin, said collar comprising a body having a longitudinal axis, and an axially-extending pin-receiving hole therethrough, a bearing section forming part of the body, a bearing surface on a first end of the bearing section at a first end of the body which lies substantially normal to the longitudinal axis and bears against the said bearing region, an internal thread disposed in the wall of the pin-receiving hole within the bearing section, which thread engages at least the said three fully-formed convolutions of threads on the pin, and engaging the same, a counterbore bounding the hole contiguous to the first end of the collar, the counterbore having a minimum aperture greater than the said first diameter of the pin, and of length receiving, and containing, all of said incomplete convolutions, a wrench-engaging section forming part of the body and formed integrally with said bearing section prior to formation of the joint, wrench-engaging surfaces on the wrench-engaging section adjacent to the second end of the collar, a circumferential groove formed in said body prior to formation of the joint, said grooves being disposed between the bearing and wrench-engaging sections and providing a reduced cross-section with the minimum torsional shear strength of said collar, whereby the maximum torque which can be exerted between the sections is determined by the cross-section at this groove, the wrench-engaging section having sheared off at the groove when torque of a predetermined value was exerted between the sections thereby to leave the joint set to a torque level determined by said reduced cross-section, and the collar reduced in axial length to that of the bearing section.

2. A joint according to claim 1 in which the shank of the pin makes a close tolerance fit in the hole in the workpiece.

3. A joint according to claim 1 in which the shank of the pin makes an interference fit in the hole in the workpiece.

4. A joint according to claim 1 in which the wrench-engaging means comprises a non-circular recess extending axially into the pin from the first end thereof, which recess penetrates to a depth insufficient to reduce the cross-section of the pin within the three of said engaged fully-formed thread convolutions closest to the incomplete threads.

5. A joint according to claim 4 in which the shank of the pin makes a close tolerance fit in the hole in the workpiece.

6. A joint according to claim 4 in which the shank of the pin makes an interference fit in the hole in the workpiece.

References Cited

UNITED STATES PATENTS

| 1,971,200 | 8/1934 | Proctor | 85—1 |
| 2,430,613 | 11/1947 | Hodge | 85—45 |
| 2,895,367 | 7/1959 | Nagy | 85—1 |
| 2,940,495 | 6/1960 | Wing | 85—61 |
| 2,972,274 | 2/1961 | La Bombard et al. | 85—1 |
| 3,041,912 | 6/1962 | Kreider et al. | 85—1 |
| 3,138,987 | 6/1964 | Wing | 85—61 |

CARL W. TOMLIN, *Primary Examiner.*

R. S. BRITTS, *Assistant Examiner.*